US012534654B2

(12) United States Patent
Takahashi

(10) Patent No.: US 12,534,654 B2
(45) Date of Patent: *Jan. 27, 2026

(54) COMPOSITION INCLUDING 1,1,2-TRIFLUOROETHANE (HFC-143)

(71) Applicant: DAIKIN INDUSTRIES, LTD., Osaka (JP)

(72) Inventor: Kazuhiro Takahashi, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 913 days.

This patent is subject to a terminal disclaimer.

(21) Appl. No.: 17/471,976

(22) Filed: Sep. 10, 2021

(65) Prior Publication Data

US 2021/0403779 A1    Dec. 30, 2021

Related U.S. Application Data

(63) Continuation of application No. PCT/JP2020/010655, filed on Mar. 11, 2020.

(30) Foreign Application Priority Data

Mar. 11, 2019    (JP) .................. 2019-044200

(51) Int. Cl.
*C09K 5/04* (2006.01)
(52) U.S. Cl.
CPC ........ *C09K 5/044* (2013.01); *C09K 2205/122* (2013.01); *C09K 2205/126* (2013.01); *C09K 2205/22* (2013.01); *C09K 2205/32* (2013.01)

(58) Field of Classification Search
CPC .............. C09K 5/044; C09K 2205/122; C09K 2205/126; C09K 2205/22; C09K 2205/32
See application file for complete search history.

(56) References Cited

U.S. PATENT DOCUMENTS

| | | | |
|---|---|---|---|
| 4,810,403 A | 3/1989 | Bivens et al. | |
| 5,059,729 A * | 10/1991 | Gervasutti | C07C 17/00 570/175 |
| 5,391,311 A * | 2/1995 | Ishida | C09K 5/045 508/435 |

(Continued)

FOREIGN PATENT DOCUMENTS

| | | |
|---|---|---|
| CN | 105753634 | 7/2016 |
| CN | 108148556 | 6/2018 |

(Continued)

OTHER PUBLICATIONS

JP2016130236 translation. (Year: 2016).*

(Continued)

*Primary Examiner* — Angela C Brown-Pettigrew
*Assistant Examiner* — Jiajia Janie Cai
(74) *Attorney, Agent, or Firm* — Wenderoth, Lind & Ponack, L.L.P.

(57) ABSTRACT

A novel composition comprising HFC-143 is provided. This invention relates to a composition comprising a refrigerant, wherein the refrigerant comprises 1,1,2-trifluoroethane (HFC-143), and at least one compound selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131).

8 Claims, 1 Drawing Sheet

(56) References Cited

U.S. PATENT DOCUMENTS

| | | | | |
|---|---|---|---|---|
| 5,626,790 A | * | 5/1997 | Minor | C08J 9/149 |
| | | | | 510/408 |
| 5,830,325 A | * | 11/1998 | Mahler | C07C 19/08 |
| | | | | 203/55 |
| 9,862,660 B2 | * | 1/2018 | Fukushima | C07C 17/37 |
| 2017/0297982 A1 | * | 10/2017 | Deur-Bert | C07C 21/18 |
| 2021/0340082 A1 | * | 11/2021 | Iwamoto | B01J 21/18 |

FOREIGN PATENT DOCUMENTS

| | | | | |
|---|---|---|---|---|
| EP | 3109225 | | 12/2016 | |
| EP | 3954674 | | 2/2022 | |
| JP | H0532567 A | * | 2/1993 | |
| JP | 8-502996 | | 4/1996 | |
| JP | 2016-130236 | | 7/2016 | |
| JP | 2016130236 A | * | 7/2016 | ........... C07C 17/383 |
| WO | 94/11460 | | 5/1994 | |

OTHER PUBLICATIONS

JP H0532567 A translation. (Year: 1993).*
International Search Report issued May 12, 2020 in International (PCT) Application No. PCT/JP2020/010655.
Extended European Search Report issued Oct. 21, 2022 in European Patent Application No. 20769443.
English translation of International Preliminary Report on Patentability dated Aug. 25, 2021 in International (PCT) Application No. PCT/JP2020/010655.

* cited by examiner

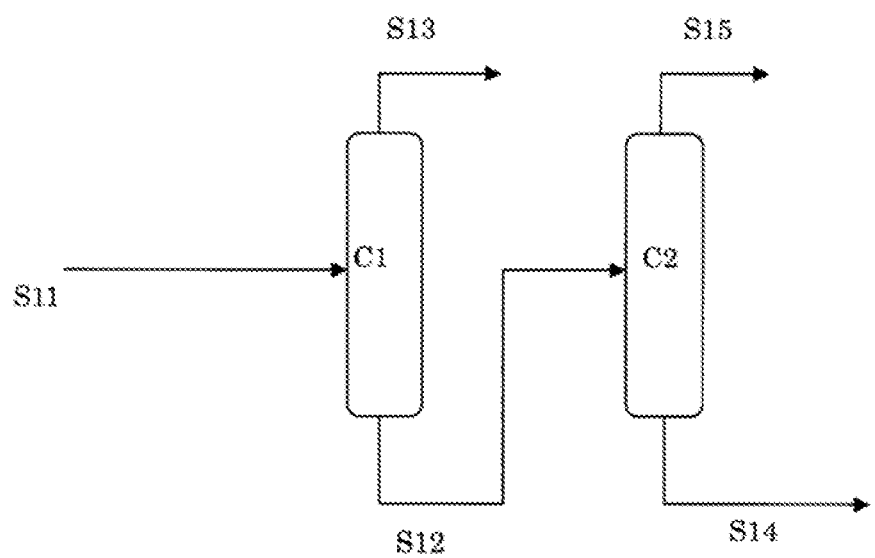

COMPOSITION INCLUDING 1,1,2-TRIFLUOROETHANE (HFC-143)

TECHNICAL FIELD

The present disclosure relates to a composition comprising at least one compound selected from the group consisting of 1,1,2-trifluoroethane (HFC-143), 1-chloro-1,2,2-trifluoroethane (HCFC-133), 1-chloro-1,1,2-trifluoroethane (HCFC-133b), and 1-chloro-2-fluoroethylene (HCFO-1131).

BACKGROUND ART

HFC-143 is not only useful as an intermediate for obtaining HFO-1132, but is also itself useful as a refrigerant (Patent Literature 1).

CITATION LIST

Patent Literature

PTL 1: JP1996-502996A

SUMMARY

Item 1.

A composition comprising a refrigerant, the refrigerant comprising 1,1,2-trifluoroethane (HFC-143) and at least one compound selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131).

Advantageous Effects of Invention

The present disclosure provides a novel composition.

BRIEF DESCRIPTION OF DRAWINGS

FIG. 1 is a schematic view of the operation of an example in which a distillation column is used to distill a composition comprising HFC-143 and, as additional components, HFO-1123, ethylene, HFC-161, HFC-152, HCFC-133, HCFC-123, and HCFC-21.

DESCRIPTION OF EMBODIMENTS

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, the term "azeotrope-like composition" refers to a composition that can be handled in substantially the same manner as azeotropic compositions. Specifically, the term "azeotrope-like composition" means a mixture composed of two or more substances that behave substantially as a single substance with a constant boiling point, or substantially a constant boiling point. One feature of the azeotrope-like composition is that vapor generated by evaporating or distilling a liquid has a formulation substantially unchanged from the formulation of the liquid. In other words, in this specification, a mixture that can be boiled, distilled, and refluxed without a substantial compositional change is referred to as an azeotrope-like composition.

Specifically, a composition that has a difference between the bubble-point vapor pressure of the composition and the dew-point vapor pressure of the composition at a specific temperature of 3 percent or less (based on the bubble-point pressure) is determined to be an azeotrope-like composition in this disclosure.

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

1. Composition

The composition of the present disclosure comprises at least the refrigerant of the present disclosure.

1.1 Refrigerant

The refrigerant of the present disclosure comprises HFC-143, and at least one additional compound (first additional compound) selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131).

The refrigerant of the present disclosure preferably contains the first additional compound in an amount of more than 0 mass % to less than 10 mass %, more preferably more than 0 mass % to less than 5 mass %, and even more preferably more than 0 mass % to less than 1 mass % based on the total amount of HFC-143 and the first additional compound.

Further, in addition to HFC-143 and the first additional compound described above, the refrigerant of the present disclosure may comprise a second additional compound comprising 1,1,2-trifluoroethylene (HFC-1123), 1,1-difluoroethane, fluoroethane (HFC-161), 1,1,2-trifluoroethane (HFC-143), 2-chloro-1,1,1-trifluoroethane (HCFC-133a), 2,2-dichloro-1,1,1-trifluoroethane (HCFC-123), and 1,2-difluoroethane (HFC-152a).

The refrigerant of the present disclosure preferably comprises the second additional compound in a total amount of 1 mass % or less based on the total amount of the HFC-143, first additional compound, and second additional compound. The composition comprising the refrigerant of the present disclosure that contains the second additional compound in the above proportion has excellent stability, and can be used as a starting material for producing 1,2-difluoroethylene (HFO-1132).

The refrigerant of the present disclosure preferably comprises HFC-143, the first additional compound, and the second additional compound in a total amount of 99.5 mass % or more based on the entire refrigerant.

1.2 Azeotropic or Azeotrope-Like Composition

The composition of the present disclosure is preferably an azeotropic or azeotrope-like composition. The azeotropic or azeotrope-like composition can be an important composition when azeotropic distillation is performed for separating an additional compound in a mixture of HFC-143 and an additional compound from HFC-143.

In the above, the additional compound may comprise the first additional compound, and optionally the second additional compound.

Azeotropic distillation is a method of concentration or separation of a target product by operating a distillation column under conditions in which an azeotropic or azeotrope-like composition is separated. In some cases, azeotropic distillation can allow distillation of only the target component for separation. In other cases, however, azeotropic distillation occurs only when another component that forms an azeotropic mixture with one or more of the target components for separation is added from the outside. In a narrow sense, only the latter is referred to as azeotropic distillation. For example, the first additional compound can be separated from HCFC-143 by extracting an azeotropic or azeotropic-like composition comprising HFC-143 and a first additional compound from a composition comprising at least HFC-143 and a first additional compound by azeotropic distillation.

At a temperature of 40° C. and a pressure of 0.38 MPa (absolute pressure), the mixture of HFC-143 and HCFC-133 becomes an azeotropic composition when the mass ratio of HFC-143 to HCFC-133 is HFC-143:HCFC-133=74:26, and an azeotrope-like composition when the mass ratio is HFC-143:HCFC-133=15:85 to 99.9:0.1.

At a temperature of 40° C. and a pressure of 0.40 MPa (absolute pressure), a mixture of HFC-143 and HCFC-133b becomes an azeotropic composition when the mass ratio of HFC-143 to HCFC-133b is HFC-143:HCFC-133b=48:52, and an azeotrope-like composition when the mass ratio is HFC-143:HCFC-133b=23:77 to 99.9:0.1.

At a temperature of 40° C. and a pressure of 0.50 MPa (absolute pressure), the mixture of HFC-143 and trans-HCFO-1131 becomes an azeotropic composition when the mass ratio of HFC-143 to trans-HCFO-1131 is HFC-143:trans-HCFO-1131=56:44, and an azeotrope-like composition when the mass ratio is HFC-143:trans-HCFO-1131=41:59 to 71:29.

At a temperature of 40° C. and a pressure of 0.43 MPa (absolute pressure), a mixture of HFC-143 and cis-HCFO-1131 becomes an azeotropic composition when the mass ratio of HFC-143 to cis-HCFO-1131 is HFC-143:cis-HCFO-1131=59:41, and an azeotrope-like composition when the mass ratio is HFC-143:cis-HCFO-1131=38:62 to 99.9:0.1.

1.3 Heat Transfer Medium Composition

The composition according to the present disclosure can be used as a heat transfer medium composition.

When the composition of the present disclosure is used as a heat transfer medium composition, it can also be used as a refrigerant having a lower global warming potential (GWP) that is alternative to a refrigerant, such as HFC134a, R-410A, R-407C, or R-404A, which is a conventionally used HFC refrigerant; or as a component of the above refrigerant.

The composition of the present disclosure used as a heat transfer medium composition may further contain at least one other component in addition to the first and second additional compounds. The composition of the present disclosure can be further used for obtaining a working fluid for a refrigerating machine by being mixed with at least a refrigeration oil (the composition of the present disclosure in this case is referred to as "the refrigerant composition of the present disclosure").

The refrigerant composition of the present disclosure may optionally comprise at least one of the other components described below. The other components are not limited, and specific examples include water, a tracer, an ultraviolet fluorescent dye, a stabilizer, and a polymerization inhibitor.

When the refrigerant composition of the present disclosure is used as a working fluid in a refrigerating machine, it is usually used by being mixed with at least a refrigeration oil. Therefore, the refrigerant composition of the present disclosure is preferably substantially free from a refrigeration oil. Specifically, in the refrigerant composition of the present disclosure, the content of a refrigeration oil based on the entire composition is preferably 0 to 1 mass %, and more preferably 0 to 0.1 mass %.

The refrigerant composition according to the present disclosure may contain a small amount of water. The water content in the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

Specifically, the following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, CF $CH_2F$)
HFC-134 (1,1,2,2-tetrafluoroethane, $CHF_2CHF_2$)
HFC-143a (1,1,1-trifluoroethane, $CF_3CHF_3$)
HFC-152 (1,2-difluoroethane, $CH_2FCH_2F$)
HFC-245fa (1,1,1,3,3-pentafluoropropane, $CF_3CH_2CHF_2$)
HFC-236fa (1,1,1,3,3,3-hexafluoropropane, $CF)CH_2CF_1$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OH_2CF_3$)

The refrigerant composition according to the present disclosure may comprise a tracer in a total amount of about 10 parts per million (ppm) by weight to about 1000 ppm, based on the entire refrigerant composition. The refrigerant composition according to the present disclosure may comprise a tracer in a total amount of preferably about 30 ppm to about 500 ppm, and more preferably about 50 ppm to about 300 ppm, based on the entire refrigerant composition.

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitrobenzene and nitrostyrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is not limited. Generally, the content of the stabilizer is preferably 0.01 to 5 mass %, and more preferably 0.05 to 2 mass %, based on the entire refrigerant.

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is not limited. Generally, the content of the polymerization inhibitor is preferably 0.01 to 5 mass %, and more preferably 0.05 to 2 mass %, based on the entire refrigerant.

The composition of the present disclosure can be used as a working fluid for a refrigerating machine that contains a refrigeration oil (this composition is referred to as the "refrigeration oil-containing working fluid").

The refrigeration oil-containing working fluid according to the present disclosure comprises at least the refrigerant composition according to the present disclosure, and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition. The refrigeration oil-containing working fluid generally comprises 10 to 50 mass % of refrigeration oil.

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additives may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

2. Separation Method

The present disclosure comprises a separation process of components using the above composition.

For example, an additional compound can be separated from HFC-143 by extracting an azeotropic or azeotrope-like composition that comprises HFC-143 and an additional compound from a composition that comprises at least HFC-143 and the additional compound by azeotropic distillation.

In the above, the additional compound comprises the first additional compound, and it may optionally comprise the second additional compound.

Specifically, examples of the method for separating an azeotropic composition comprising HFC-143 and HCFC-133b from a composition comprising HFC-143 and HCFC-133b include a method including the following steps.

A separation method comprising the steps of: (1) supplying a composition comprising HFC-143 and HCFC-133b to a first distillation column, and distilling the composition; (2) extracting an azeotropic composition comprising HPC-143 and HCFC-133b as a top distillate of the first distillation column, and extracting HFC-143 or HCFC-133b from the bottom of the first distillation column; (3) optionally supplying the top distillate to a second distillation column having an operation condition different from that of the first distillation column, and distilling the top distillate; and (4) optionally extracting, from the bottom of the second distillation column, a stream enriched in the compound that has been extracted from the bottom of the first distillation column.

The starting composition containing HFC-143 and HCFC-133b may be a non-azeotropic composition consisting only of HFC-143 and HCFC-133b, or a composition further comprising one or more components in addition to HFC-143 and HCFC-133b.

The azeotropic composition comprising HFC-143 and HCFC-133b may be an azeotropic composition consisting only of HFC-143 and HCFC-133b.

The operating pressure of the second distillation column may be lower or higher than the operating pressure of the first distillation column.

The top distillate of the second distillation column may be recycled to the first distillation column.

Embodiments are described above; however, it can be understood that various changes in forms and details can be made without departing from the spirit and scope of the claims.

Item 1.

A composition comprising a refrigerant,
the refrigerant comprising 1,1,2-trifluoroethane (HFC-143) and at least one compound selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131).

Item 2.

The composition according to Item 1, wherein the refrigerant comprises

HFC-143;

at least one compound selected from the group consisting of HCFC-133, HCFC-133b, and HCFO-1131; and additionally at least one additional compound selected from the group consisting of 1,1,2-trifluoroethylene (HFC-1123), 1,1-difluoroethane (HFC-152a), fluoroethane (HFC-161), 1,1,2-trifluoroethane (HFC-143), 2-chloro-1,1,1-trifluoroethane (HCFC-133a), 2,2-dichloro-1,1,1-trifluoroethane (HCFC-123), and 1,2-difluoroethane (HFC-152).

Item 3.

The composition according to Item 1 or 2, which is an azeotropic or azeotrope-like composition.

Item 4.

A composition according to Item 2 or 3, wherein the additional compound is present in a total amount of 1 mass % or less based on the entire refrigerant.

Item 5.

Use of the composition according to any one of Items 1 to 4 as a heat transfer medium composition.

Item 6.

A method for separating an azeotropic composition comprising HFC-143 and HCFC-133b from a composition comprising HFC-143 and HCFC-133b, the method comprising the steps of: (1) supplying a composition comprising HFC-143 and HCFC-133b to a first distillation column, and distilling the composition; (2) extracting an azeotropic composition comprising HPC-143 and HCFC-133b as a top distillate of the first distillation column, and extracting HFC-143 or HCFC-133b from the bottom of the first distillation column; and optionally (3) supplying the top distillate to a second distillation column having an operation condition different from the operation condition of the first distillation column, and distilling the top distillate.

Item 7.

The separation method according to Item 6, wherein the operating pressure of the second distillation column is lower than the operating pressure of the first distillation column.

Item 8.

The separation method according to Item 6, wherein the operating pressure of the second distillation column is higher than the operating pressure of the first distillation column.

Item 9.

The separation method according to any one of Items 6 to 8, wherein a top distillate of the second distillation column is recycled to the first distillation column.

EXAMPLES

A more detailed explanation is provided below with reference to Examples.

Table 1 illustrates the vapor-liquid equilibrium data of HFC-143 and HCFC-133b. The pressure indicates the absolute pressure.

TABLE 1

| Temperature (°C.) | Pressure (MPa) | Liquid phase (R-143) molar ratio | Gas phase (R-143) molar ratio |
|---|---|---|---|
| 40 | 0.375 | 0.1 | 0.166 |
| 40 | 0.386 | 0.2 | 0.283 |
| 40 | 0.409 | 0.3 | 0.374 |
| 40 | 0.417 | 0.4 | 0.451 |
| 40 | 0.422 | 0.5 | 0.521 |
| 40 | 0.422 | 0.55 | 0.555 |
| 40 | 0.422 | 0.6 | 0.590 |
| 40 | 0.419 | 0.7 | 0.663 |
| 40 | 0.411 | 0.8 | 0.747 |
| 40 | 0.397 | 0.9 | 0.853 |
| 40 | 0.377 | 0.99 | 0.983 |

Table 2 illustrates the vapor-liquid equilibrium data of HFC-143 and HCFC-133. The pressure indicates the absolute pressure.

TABLE 2

| Temperature (°C.) | Pressure (MPa) | Liquid phase (R-143) molar ratio | Gas phase (R-143) molar ratio |
|---|---|---|---|
| 40 | 0.340 | 0.1 | 0.133 |
| 40 | 0.351 | 0.2 | 0.248 |
| 40 | 0.359 | 0.3 | 0.352 |
| 40 | 0.367 | 0.4 | 0.446 |
| 40 | 0.372 | 0.5 | 0.536 |
| 40 | 0.376 | 0.6 | 0.622 |
| 40 | 0.378 | 0.7 | 0.709 |
| 40 | 0.379 | 0.75 | 0.753 |
| 40 | 0.379 | 0.8 | 0.798 |
| 40 | 0.377 | 0.9 | 0.894 |
| 40 | 0.374 | 0.99 | 0.989 |

Table 3 illustrates the vapor-liquid equilibrium data of HFC-143 and HCFC-1131(E). The pressure indicates the absolute pressure.

TABLE 3

| Temperature (°C.) | Pressure (MPa) | Liquid phase (R-143) molar ratio | Gas phase (R-143) molar ratio |
|---|---|---|---|
| 40 | 0.407 | 0.99 | 0.971 |
| 40 | 0.454 | 0.9 | 0.802 |
| 40 | 0.481 | 0.8 | 0.698 |
| 40 | 0.495 | 0.7 | 0.629 |
| 40 | 0.501 | 0.6 | 0.575 |
| 40 | 0.501 | 0.55 | 0.55 |
| 40 | 0.501 | 0.5 | 0.525 |
| 40 | 0.495 | 0.4 | 0.473 |
| 40 | 0.484 | 0.3 | 0.421 |
| 40 | 0.463 | 0.2 | 0.33 |
| 40 | 0.429 | 0.1 | 0.209 |

Table 4 illustrates the vapor-liquid equilibrium data of HFC-143 and HCFC-1131(Z). The pressure indicates the absolute pressure.

TABLE 4

| Temperature (°C.) | Pressure (MPa) | Liquid phase (R-143) molar ratio | Gas phase (R-143) molar ratio |
|---|---|---|---|
| 40 | 0.371 | 0.1 | 0.189 |
| 40 | 0.397 | 0.2 | 0.308 |
| 40 | 0.413 | 0.3 | 0.396 |
| 40 | 0.423 | 0.4 | 0.466 |

TABLE 4-continued

| Temperature (°C.) | Pressure (MPa) | Liquid phase (R-143) molar ratio | Gas phase (R-143) molar ratio |
|---|---|---|---|
| 40 | 0.428 | 0.5 | 0.529 |
| 40 | 0.429 | 0.58 | 0.678 |
| 40 | 0.429 | 0.6 | 0.591 |
| 40 | 0.426 | 0.7 | 0.659 |
| 40 | 0.417 | 0.8 | 0.74 |
| 40 | 0.401 | 0.9 | 0.846 |
| 40 | 0.377 | 0.99 | 0.981 |

Example 1

The process for obtaining an azeotropic composition comprising HFC-143 and HCFO-133b by separation was performed as follows. FIG. 1 shows an example of a distillation separation process using an azeotropic composition. A non-azeotropic composition (starting composition) comprising HFC-143 and HCFC-133b was fed from S11 to a distillation column C1. An azeotropic composition comprising HFC-143 and HCFC-133b flowed out from S13, and a non-azeotropic composition comprising HFC-143 and HCFC-133b in which the concentrations of HCFC-133b, HCFO-1131(E), and HCFO-1131(Z) were reduced as compared to those in the starting composition was obtained from S12. S12 was sent to the next step. In C2, the azeotropic formulation to be obtained by changing the pressure conditions from that in C1 can be changed. Using this, a composition substantially consisting only of HFC-143 in which the concentrations of HCFC-133b, HCFC-133, HCFO-1131 (E), and HCFO-1131(Z) are reduced as compared to those in S12, can be obtained from S14. Table 5 shows the flow rate of each component obtained from the composition ratio (mass ratio) in each stream in which distillation was performed. By using this process, an HFC-143 purification process with minimum loss can be established.

The operating pressure was as follows: C1=0/5 MPa; C2=0.4 MPa. The pressure indicates the absolute pressure.

TABLE 5

| | Flow rate (kg/hr) | | | | |
|---|---|---|---|---|---|
| | S11 | S12 | S13 | S14 | S15 |
| HFC143 | 0.96 | 0.93 | 0.03 | 0.86 | 0.07 |
| HCFC133 | 0.01 | 0.01 | 0.00 | 0.002 | 0.008 |
| HCFC133b | 0.01 | 0.005 | 0.005 | 0.00 | 0.005 |
| HCFO1131 (E) | 0.01 | 0.00 | 0.01 | 0.00 | 0.00 |
| HCFO1131 (Z) | 0.01 | 0.001 | 0.009 | 0.00 | 0.001 |

Example 2

The refrigerating capacity of each refrigerant comprising R143 and additional compounds was compared. Table 6 shows the results. The refrigeration cycle conditions are as follows.

Evaporating temperature: 10° C.

Condensation temperature: 45° C.

Superheating temperature: 5° C.

Subcooling temperature: 5° C.

Zero loss

Efficiency: 100%

TABLE 6

| | Weight ratio | COP | Refrigerating capacity |
|---|---|---|---|
| | (HFC-245fa: conventional refrigerant ratio) | | |
| HFC-143/HCFO-1131 (E) | 99/1 | 1.019 | 1.619 |
| HFC-143/HCFO-1131 (Z) | 99/1 | 1.019 | 1.612 |
| HFC-143/HCFC-133 | 99/1 | 1.018 | 1.614 |
| HFC-143/HCFC-133b | 99/1 | 1.018 | 1.614 |

The invention claimed is:

1. A heat transfer medium composition comprising a refrigerant, the refrigerant comprising 1,1,2-trifluoroethane (HFC-143), at least one compound selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131), and at least one additional compound selected from the group consisting of 1,1-difluoroethane (HFC-152a), fluoroethane (HFC-161), 2,2-dichloro-1,1,1-trifluoroethane (HCFC-123), and 1,2-difluoroethane (HFC-152), wherein:

the compound is present in a total amount of more than 0 mass % to less than 1 mass % based on the total amount of HFC-143 and the compound, the additional compound is present in a total amount of 1 mass % or less based on the entire refrigerant, and HFC-143, the compound, and the additional compound are present in a total amount of 99.5 mass % or more based on the entire refrigerant.

2. A composition comprising a refrigerant, the refrigerant comprising 1,1,2-trifluoroethane (HFC-143) and, at least one compound selected from the group consisting of 1-chloro-1,2,2-trifluoroethane (HCFC-133), 1-chloro-1,1,2-trifluoroethane (HCFC-133b), and 1-chloro-2-fluoroethylene (HCFO-1131), and at least one additional compound selected from fluoroethane (HFC-161), 2,2-dichloro-1,1,1-trifluoroethane (HCFC-123), and 1,2-difluoroethane (HFC-152), wherein the compound is present in a total amount of more than 0 mass % to less than 1 mass % based on the total amount of HFC-143 and the compound, the additional compound is present in a total amount of 1 mass % or less based on the entire refrigerant, and HFC-143, the compound, and the additional compound are present in a total amount of 99.5 mass % or more based on the entire refrigerant.

3. The heat transfer medium composition according to claim 1, which is an azeotropic or azeotrope-like composition.

4. The composition according to claim 2, which is an azeotropic or azeotrope-like composition.

5. A method for refrigeration, said method comprising operating a refrigeration machine employing the heat transfer medium composition according to claim 1.

6. A method for refrigeration, said method comprising operating a refrigeration machine employing the composition according to claim 2.

7. A method for refrigeration, said method comprising operating a refrigeration machine employing the heat transfer medium composition according to claim 3.

8. A method for refrigeration, said method comprising operating a refrigeration machine employing the composition according to claim 4.

* * * * *